United States Patent
Lee et al.

(10) Patent No.: US 8,817,862 B2
(45) Date of Patent: Aug. 26, 2014

(54) EQUALIZER AND EQUALIZING METHOD

(75) Inventors: Chao-Cheng Lee, Hsin-Chu (TW); Tzu-Chien Tzeng, Hsin-Chu (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 594 days.

(21) Appl. No.: 13/048,877

(22) Filed: Mar. 16, 2011

(65) Prior Publication Data

US 2012/0235763 A1    Sep. 20, 2012

(51) Int. Cl.
H03K 5/159 (2006.01)
H04L 25/03 (2006.01)
H04B 3/04 (2006.01)
H03H 7/30 (2006.01)
H03H 7/40 (2006.01)

(52) U.S. Cl.
CPC ............ *H04B 3/04* (2013.01); *H04L 25/03885* (2013.01)
USPC ........... 375/229; 375/230; 375/232; 375/233; 375/316

(58) Field of Classification Search
USPC .......................... 375/229, 230, 232, 233, 316
See application file for complete search history.

(56) References Cited

U.S. PATENT DOCUMENTS

| 7,822,113 | B2 * | 10/2010 | Tonietto et al. | 375/233 |
| 8,385,401 | B2 * | 2/2013 | Miller | 375/233 |
| 2005/0135471 | A1 * | 6/2005 | Tonietto et al. | 375/233 |
| 2007/0153887 | A1 | 7/2007 | Tate | |
| 2009/0016422 | A1 | 1/2009 | Zhong | |
| 2011/0051799 | A1 * | 3/2011 | Lee | 375/233 |

FOREIGN PATENT DOCUMENTS

TW    413785    12/2000

* cited by examiner

*Primary Examiner* — Ted Wang
(74) *Attorney, Agent, or Firm* — Winston Hsu; Scott Margo (57) ABSTRACT

An equalizer and a related equalizing method for equalizing signal reflection caused by a stub at a transmitting end are provided. The equalizer includes a summing device and a delay device. The summing device is utilized for adding a feedback delay signal to the input signal to generate the equalized signal. The delay device is coupled to the summing device, and utilized for delaying the equalized signal to generate the feedback delay signal. Wherein the delay device has a variable delay time and the variable delay time is a non-integer multiple of a bit time of the input signal.

12 Claims, 6 Drawing Sheets

FIG. 6

EQUALIZER AND EQUALIZING METHOD

BACKGROUND OF THE INVENTION

1. Field of the Invention

The present invention relates to signal processing, and more particularly, to an equalizer and a related equalizing method with a variable delay time which can reduce stub effect in high speed data communication system.

2. Description of the Prior Art

Figure 1:
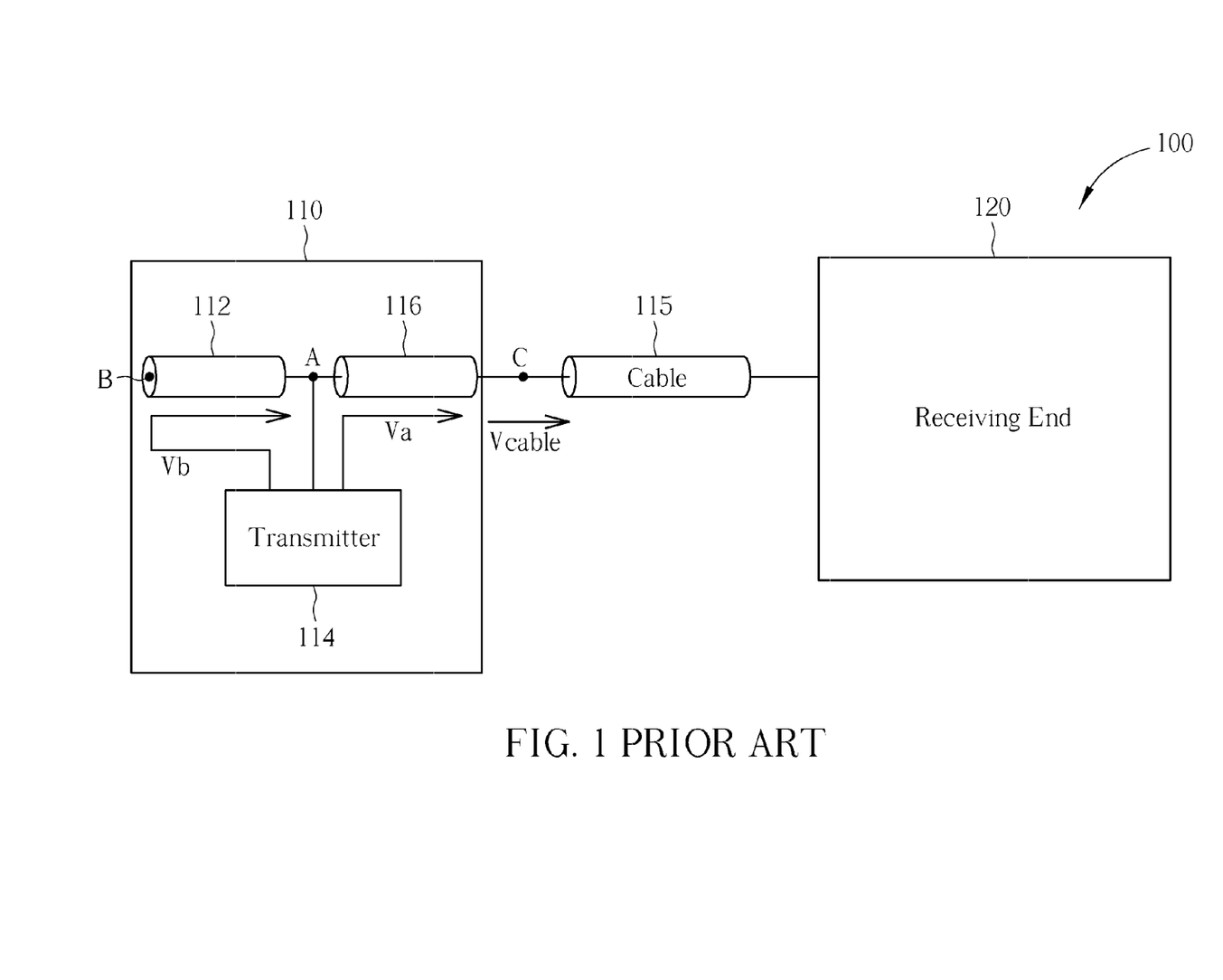
FIG. 1 is a diagram showing a stub in a conventional communication system.

With reference to FIG. 1, a communication system 100 including a transmitting end 110 and a receiving end 120 is shown, wherein the transmitting end 110 and the receiving end 120 are coupled through a cable 115. The transmitting end 110 includes a transmitter 114, and the transmitter 114 may be disposed on a Printer circuit board (PCB) on which a connector (not shown) is also disposed. The connector is utilized for connecting the cable 115 and coupled to the transmitter 114 through a PCB trace 116. Normally, a signal can be sent from the transmitter 114 through the PCB trace 116 and the cable 115 to the receiving end 120. However, in the design of the transmitting end 110, an unnecessary PCB trace 112 may be improperly implemented on the PCB due to some considerations, which forms a stub. The stub may lead to a stub effect, which leads to signal distortion, especially in high speed data communication system (e.g. High-Definition Multimedia Interface, HDMI). The stub effect is illustrated as below.

Referring to FIG. 1, when a signal Va which intends to be transmitted from the transmitter 114 of the transmitting end 110 to the receiving end 120 passes through a stub point A, a reflected signal Vb will be further generated by the signal Va reflected upon a point B. Thus, on a point C, the signal Va and the reflected signal Vb will be superposed as a signal Vcable; however, what is actually received by the receiving end 120 will be the signal Vcable rather than the original signal Va, which leads to signal distortion (namely the stub effect). Further differences between signals Va, Vb and Vcable are illustrated in FIG. 2.

Figure 2:
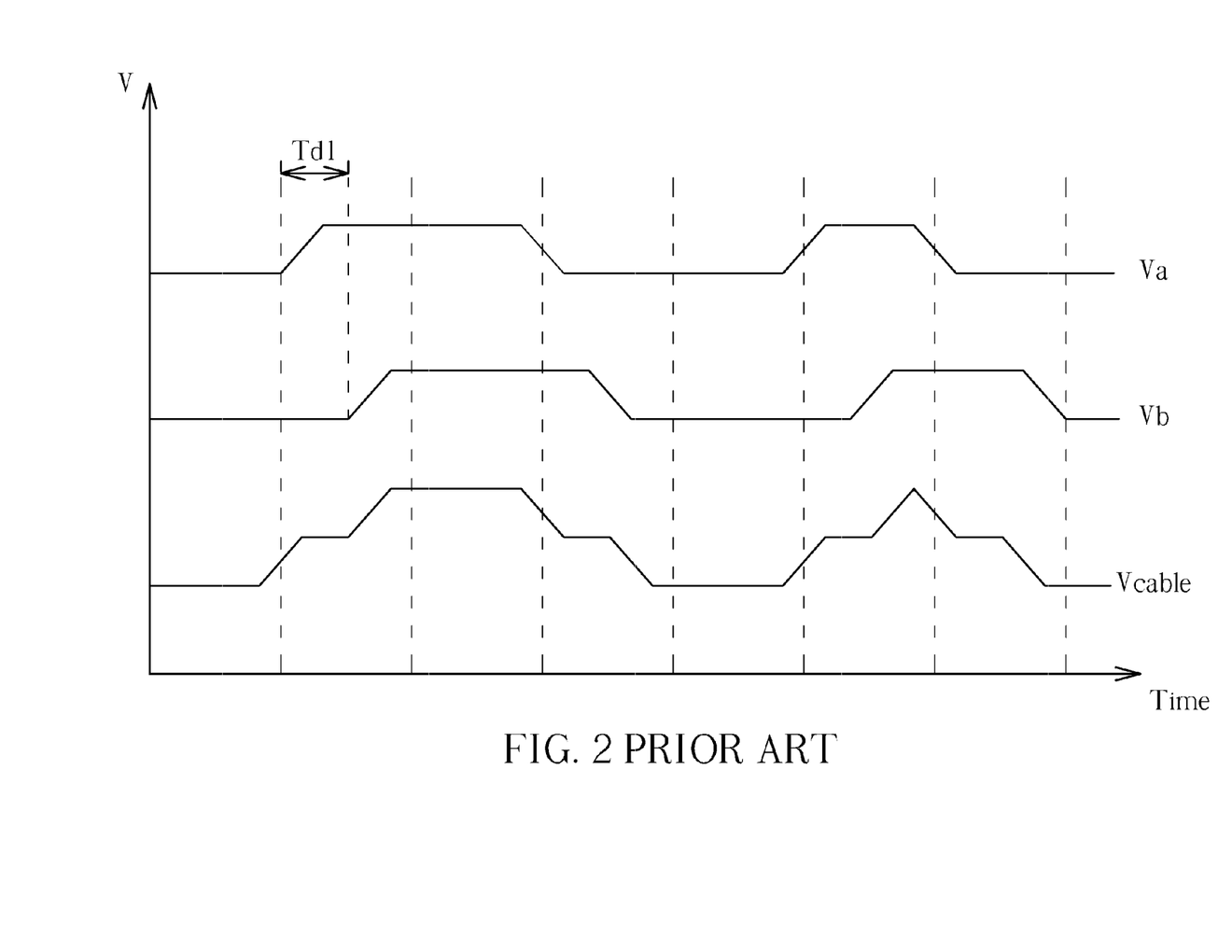
FIG. 2 is a diagram showing waveforms of different signals.

Referring to FIG. 2, as the reflected signal Vb is generated due to the reflection of the signal Va, there exists a delay time Td1 between the reflected signal Vb and the signal Va. The delay time Td1 is further relative to the length of the stub (namely the PCB trace 112). Accordingly, the signal Vcable to be transmitted through the cable 115 is therefore quite different from the original signal Va outputted from the transmitter 114 so that the receiving end 120 may acquire wrong information from the signal Vcable.

Usually, such a signal distortion due to reflection can be reduced by an equalizer at the receiving end. However, as the delay time of the reflected signal is relative to the length of the stub, the delay time becomes un-predictable. This is because the PCB trace 112 is not always consistent. In some designs the PCB trace 112 may be very short while in other designs the PCB trace 112 may be very long. Even, the PCB trace 112 may not exist in still other designs. Thus, the conventional equalizer can not effectively and properly reduce the stub effect, which may further makes the equalized signal worse than the un-equalized signal.

SUMMARY OF THE INVENTION

With this in mind, it is one of the objectives of the present invention to provide an equalizer and a related equalizing method thereof which can reduce/cancel the signal reflection (i.e., the stub effect) due to the stub existing in a receiving end of a communication system. The present invention simulates the reflected signal caused by the stub by a variable delay time. Then, the present invention utilizes a delay signal having a delay time to cancel the reflection existing in an input signal. Thus, no matter how long the stub is, the inventive equalizer can properly adjust the variable delay time to reduce/cancel the stub effect.

According to one exemplary of the present invention, an equalizer is provided. The equalizer comprises a summing device and a delay device. The summing device is configured for adding a feedback delay signal to the input signal to generate the equalized signal. The delay device is coupled to the summing device, and configured for delaying the equalized signal to generate the feedback delay signal.

According to one exemplary of the present invention, an equalizing method utilized for equalizing an input signal to generate an equalized signal is provided, and the inventive equalizing method includes: adding a feedback delay signal to the input signal to generate the equalized signal; and delaying the equalized signal to generate the feedback delay signal; wherein the step of delaying the equalized signal corresponds to a variable delay time and the variable delay time is a non-integer multiple of a bit time of the input signal.

These and other objectives of the present invention will no doubt become obvious to those of ordinary skill in the art after reading the following detailed description of the preferred embodiment that is illustrated in the various figures and drawings.

DETAILED DESCRIPTION

The present invention utilizes an equalizer which comprises a delay device with a variable delay time. The delay device firstly varies the delay time to find out the most suitable amount to simulate the actual delay time (e.g. Td1) of the signal reflection occurred at the stub. Then, the present invention utilizes a summing device to cancel/reduce the reflection part in the input signal according to the delay time.

Figure 3:
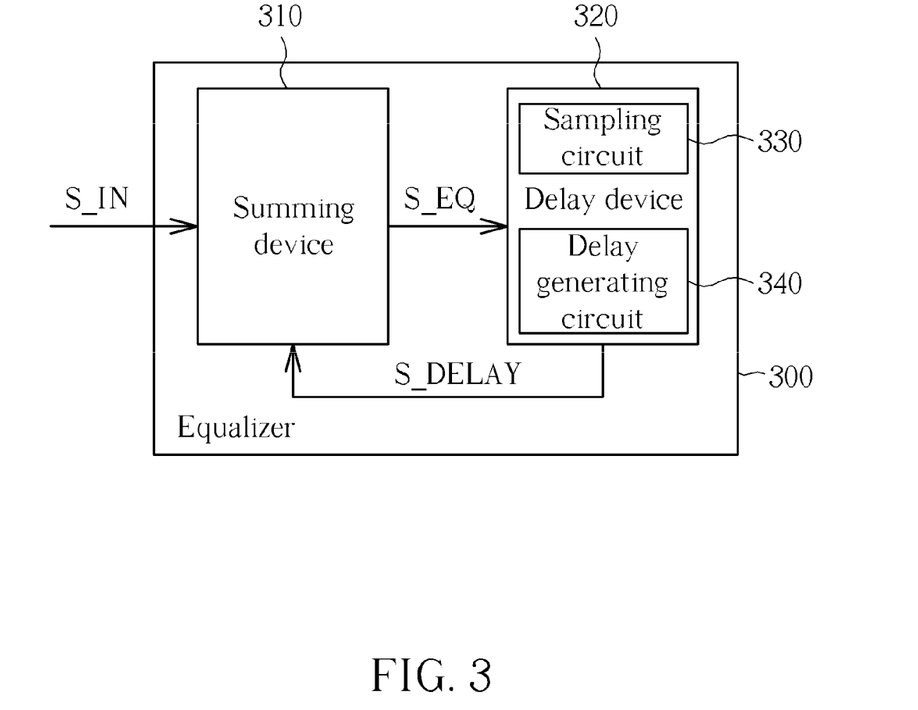
FIG. 3 is a simplified block diagram showing an inventive equalizer according to one exemplary embodiment of the present invention.

With reference to FIG. 3, a simplified block diagram of the inventive equalizer is shown according to one exemplary embodiment of the present invention. The inventive equalizer can reduce signal reflection (namely the stub effect) caused by the stub at a transmitting end (or around a transmitter). The inventive equalizer may be disposed in a receiver of a high speed data communication system such as HDMI or display visual interface (DVI) or any other possible communication system. As shown in FIG. 3, an equalizer 300 equalizes an input signal S_IN to generate an equalized signal S_EQ. Additionally, the equalizer 300 comprises a summing device 310 and a delay device 320. The summing device 310 is configured for adding a feedback delay signal S_DELAY to the input signal S_IN to generate the equalized signal S_EQ. The delay device 320 is coupled to the summing device 310 and configured for delaying the equalized signal S_EQ to generate the feedback delay signal S_DELAY, wherein the delay device can generate a delay time of variable amounts. In short, the delay device 320 generates the feedback delay signal S_DELAY which is similar to the reflected signal due to the stub, and then the summing device 310 remove the reflected signal from the input signal S_IN by adding (or subtracting) the feedback delay signal S_DELAY to the input signal S_IN. In addition, the variable delay time corresponds to the length of the stub and is substantially equivalent to the actual delay time caused by the stub. In other words, depending on the length of the stub, the inventive equalizer can make the delay device generate the most suitable delay time so that the actual delay time can be simulated. Hence, the signal reflection caused by the stub can be properly reduced/cancelled. Wherein, the variable delay time of the delay device 320 may be a non-integer multiple of a bit time of the input signal.

Figure 4:
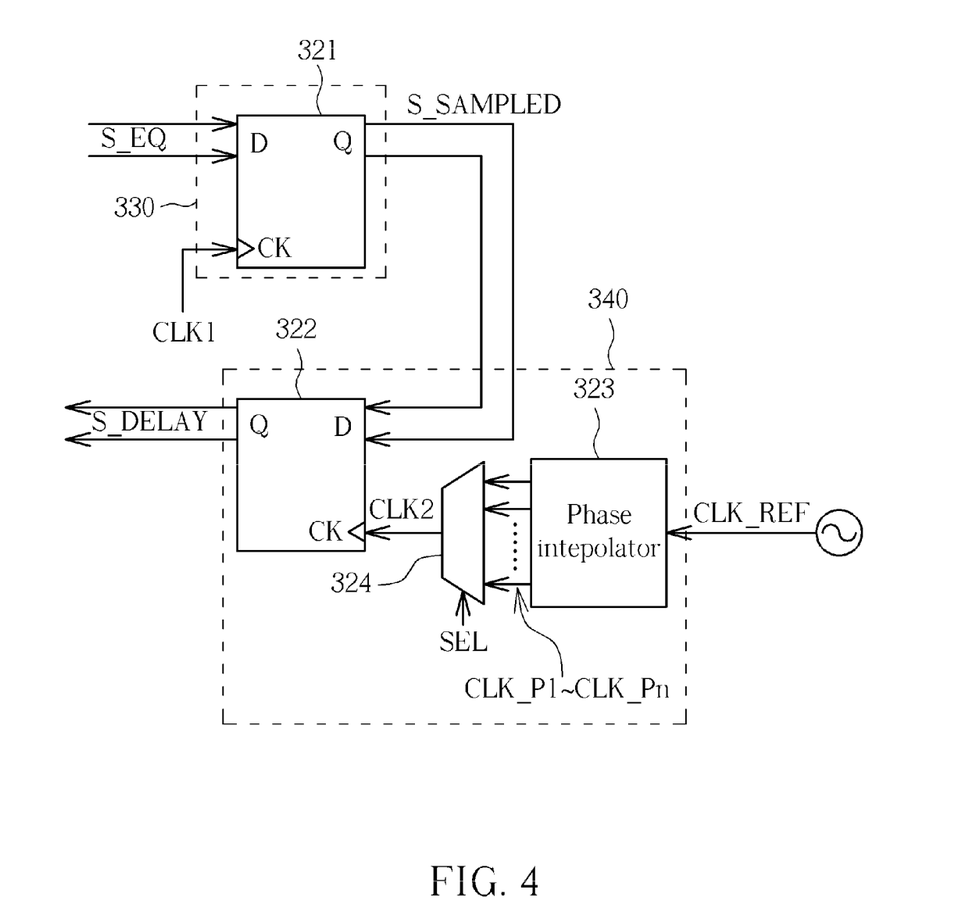
FIG. 4 is a detailed diagram showing an inventive delay device according to one exemplary embodiment of the present invention.

According to one exemplary embodiment of the present invention, the inventive delay device has architecture as shown in FIG. 4. Referring to FIG. 4, the delay device 320 comprises a sampling circuit 330 and a delay generating circuit 340. In this exemplary embodiment, the sampling circuit 330 is implemented with a first flip-flop 321 while the delay generating circuit 340 comprises a second flip-flop 322, a phase interpolator 323 and a phase selector 324. The first flip-flop 321 is coupled to the summing device 310 and configured for receiving and sampling the equalized signal S_EQ to output a sampled signal S_SAMPLED according to a first clock signal CLK1. The second flip-flop 322 is coupled to the first flip-flop 321 and configured for delaying the sampled signal S_SAMPLED to output the feedback delay signal S_DELAY according to a second clock signal CLK2. The phase interpolator 323 is configured for generating a plurality of clock signals CLK_P1-CLK_Pn having n different phases by interpolation according to a reference clock. The phase selector 324 is coupled between the phase interpolator 323 and the second flip-flop 322, and configured for selecting one of the clocks signals CLK_P1-CLK_Pn to be the second clock signal CLK2 depending on a selection signal SEL. The CLK1 and the reference clock may be from the same source clock or from different source clocks. It should be noted that the signals S_EQ, S_SAMPLED and S_DELAY shown in FIG. 4 are illustrated as differential signals; however, this is just for illustrative purpose rather than a limitation.

Operations of the delay device of FIG. 4 are described as below. Firstly, the first flip-flop 321 samples the equalized signal S_EQ outputted by the summing device 310 according to the first clock signal CLK1 inputted via its clock terminal CK, so as to generate the sampled signal S_SAMPLED. According to one exemplary embodiment of the present invention, the first clock signal CLK1 may be associated with the reference clock CLK_REF generated from a clock and data recovery (CDR) device of the receiving end. However, the first clock signal CLK1 may be associated with other clock sources of the receiving end according to other embodiments of the present invention. Both of two cases fall within the scope of the present invention. Accordingly, the generated sampled signal S_SAMPLED is then sent to the second flip-flop 322 and delayed by the second flip-flop 322 to generate the feedback delay signal S_DELAY. The second flip-flop 322 is responsible for generating a major delay amount of the delay time of the feedback delay signal S_DELAY. By different selection of the second clock signal CLK2, the second flip-flop can generate a variety of different delay times comprising a non-integer multiple of a bit time of the input signal which can reduce/cancel the stub effect. Thus, the delay device 320 can generate the delay time which is very close to the reflected signal due to the stub, to provide the feedback delay signal for the summing device 310 to reduce/cancel the stub effect. According to the different lengths of the stub, different clock signals CLK_P1-CLK_Pn will be selected as the second clock signal CLK2. The clock signals CLK_P1-CLK_Pn having n different phases are generated by the phase interpolator 323 by means of performing interpolation operations upon the reference clock CLK_REF of the CDR device; however, according to other exemplary embodiments of the present invention, the clock signals CLK_P1-CLK_Pn having n different phases may also be derived from performing interpolation operations upon other clock sources of the receiving end.

Figure 5:
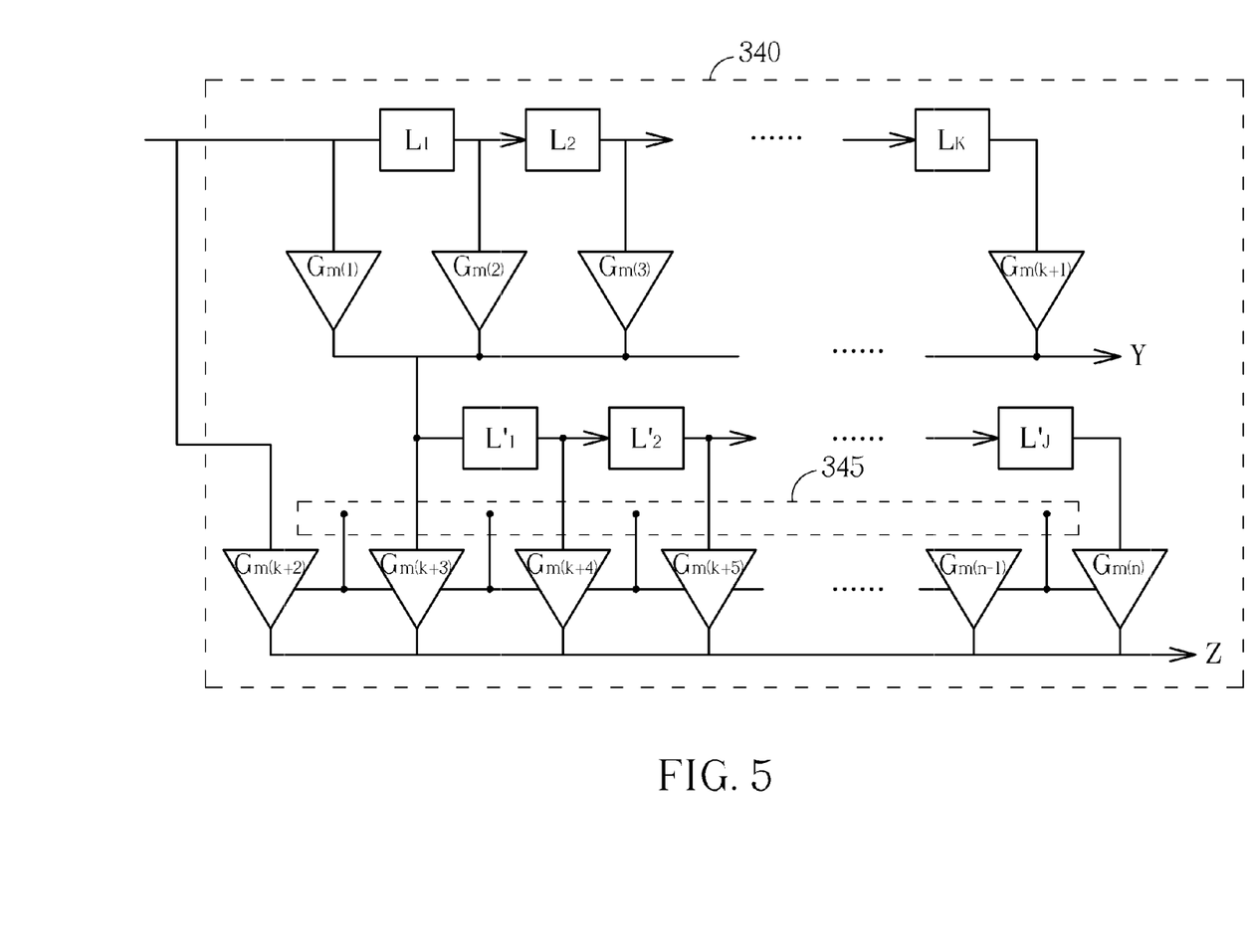
FIG. 5 is a detailed diagram showing an inventive delay device according to another exemplary embodiment of the present invention.

According to another exemplary embodiment of the present invention, another implementation of the inventive delay generating circuit 340 is further provided. Please refer to FIG. 5, which illustrates another implementation of the inventive delay device. As shown in FIG. 5, the delay generating circuit 340 comprises a plurality of first delay units $L_1$-$L_k$, a plurality of second delay units $L'_1$-$L'_J$ and a plurality of gain units $Gm_{(1)}$-$Gm_{(n)}$. The first delay units $L_1$-$L_k$ are coupled in series, and have a plurality of first delay times, respectively. The second delay units $L'_1$-$L'_J$ are coupled in series, and have a plurality second delay times, respectively. The gain units $Gm_{(1)}$-$Gm_{(n)}$ are respectively coupled between each of the first delay units $L_1$-$L_k$ and each of the second delay units $L'_1$-$L'_J$. Via the combination of the first delay units $L_1$-$L_k$ and the second delay units $L'_1$-$L'_J$, the delay generating circuit 340 can generate the non-integer delay time which is also a non-integer multiple of the bit time of the input signal. For example, the first delay units $L_1$-$L_j$ units are configured for delaying the equalized signal S_EQ with the first delay times to form an integral delay amount of the feedback delay signal S_DELAY while the second delay units $L'_1$-$L'_J$ can be configured by transmission gates for delaying the equalized signal S_EQ with the second delay times to form a fractional delay amount of the feedback delay signal S_DELAY. The gain units $Gm_{(1)}$-$Gm_{(n)}$ are operated to fine tune the total delay amount of the first and the second delay units. Accordingly, outputs of the gains units $Gm_1$-$Gm_{(n)}$ are summed to form the feedback delay signal S_DELAY. Thus, the feedback delay signal S_DELAY can be utilized for cancelling/reducing the reflection existing in the input signal S_IN.

In a preferred exemplary embodiment of the present invention, the delay generating circuit 340 further comprises a plurality of third delay units 345 (enclosed by the dash line) which are coupled in series and have a plurality of third delay times, respectively. The third delay units 345 are implemented according to an interpolation of the second delay units $L'_1$-$L'_J$ (that is implementation upon the second delay times) so that the third delay time could be even shorter than each of the first and the second delay times. The third delay units may be configured for delaying the equalized signal S_EQ with the third delay times to form a fractional delay amount of the feedback delay signal S_DELAY. Via the interpolation, the delay generating circuit 340 can have a very short delay time to more accurately simulate the actual delay time of the reflected signal due to the stub so as to reduce/cancel the stub effect.

Figure 6:
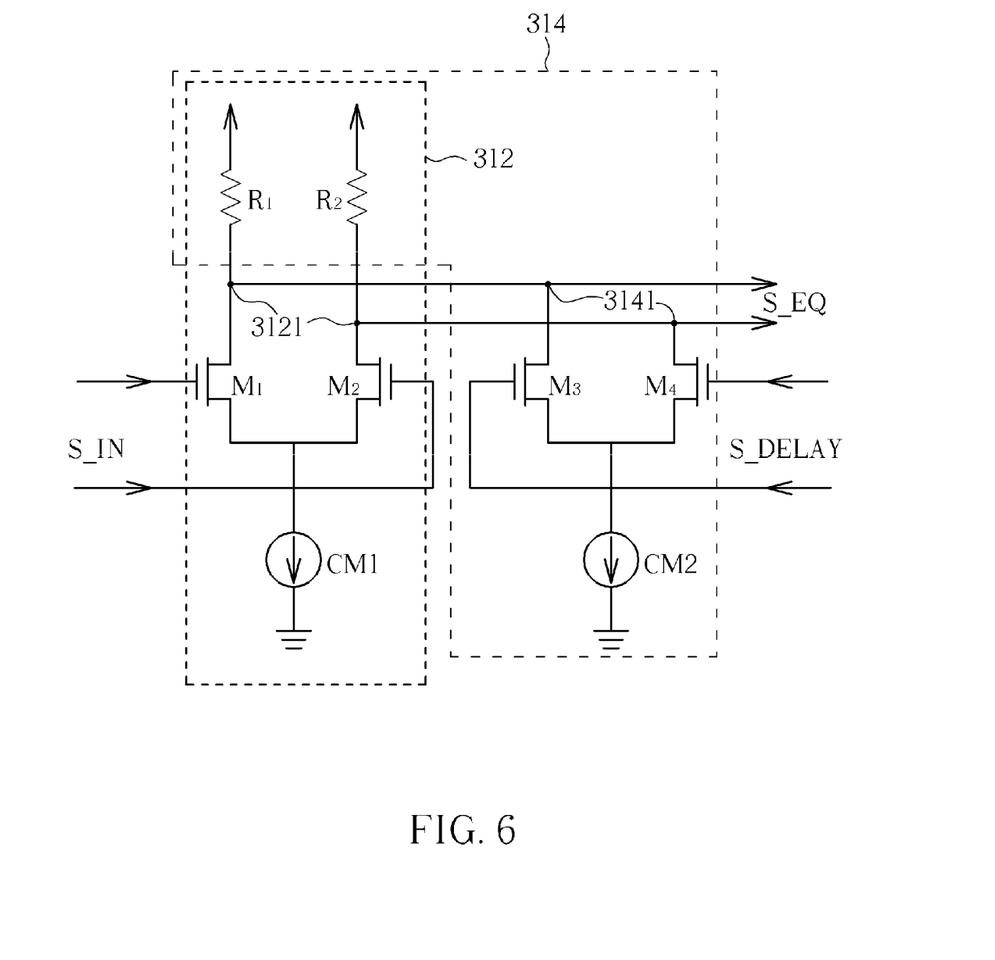
FIG. 6 is a detailed diagram showing an inventive summing device according to one exemplary embodiment of the present invention.

Please refer to FIG. 6, which illustrates a detailed block diagram of the inventive summing device as shown in FIG. 3 according to one exemplary embodiment of the present invention. The summing device 310 comprises a first differential amplifier 312 and a second differential amplifier 314. The first differential amplifier 312 comprises transistors M1 and M2, resistors R1 and R2, and a first current source CM1, and the input signal S_IN is inputted to the summing device 310 through a first differential input (namely gates of the transistors M1 and M2) of the first differential amplifier 312. The second differential amplifier 314 comprises transistors M3 and M4, resistors R1 and R2, and a second current source CM2, and the feedback delay signal S_DELAY is inputted to the summing device 310 through a second differential input (namely gates of the transistors M3 and M4) of the second differential amplifier 314. A second differential output 3141 of the second differential amplifier 314 is coupled to a first differential output 3121 of the first differential amplifier 312 so that to the feedback delay signal S_DELAY is added to the input signal S_IN to generate the equalized signal S_EQ. By adding the feedback delay signal S_DELAY having a proper delay amount corresponding to the length of the stub, to the input signal S_IN, the signal reflection (namely stub effect) in the input signal S_IN can be reduced/cancelled. Also, by properly adjusting the first current source CM1 and the second current source CM2, so that the ratio of the signal reflection can be accurately estimated so that the inventive can equalize the input signal S_IN more effectively.

Based on the inventive equalizer mentioned above, the present invention further provides an equalizing method. As mentioned above, the inventive equaling method can also be applied in a receiver of an HDMI or a DVI system for cancelling/reducing signal reflection caused by a stub at a transmitting end from which the input signal transmits. To cancelling/reducing signal reflection, inventive equalizing method can generates a variable delay time by means of an interpolation. The inventive equalizing method comprises: adding a feedback delay signal to the input signal to generate the equalized signal; and delaying the equalized signal to generate the feedback delay signal; wherein the step of delaying the equalized signal corresponds to a variable delay time and the variable delay time is a non-integer multiple of a bit time of the input signal.

In one exemplary embodiment, the step of delaying the equalized signal comprises: sampling the equalized signal to output a sampled signal according to a first clock signal corresponding to a reference clock; generating a plurality of clock signals with different phases; selecting one of the clocks signals to be a second clock signal; and delaying the sampled signal to output the feedback delay signal according to the second clock signal. In addition, the clock signals having different phases are generated by means of interpolation according to the reference clock.

In another exemplary embodiment, the step of delaying the equalized signal comprises: sampling the equalized signal to output a sampled signal according to a clock signal; performing a first delay operation for delaying the sampled signal with a plurality of first delay times, respectively; performing a second delay operation for delaying the sampled signal with a plurality of second delay times, respectively; and gaining a result of each of the first and the second delay operations to generate a plurality of gained results. Wherein, the integral part of the delay time is generated by first delay operation, and the fractional part of the delay time is generated by the second delay operation. In still another exemplary embodiment, the step of delaying the equalized signal further comprises: performing a third delay operation for delaying the sampled signal with a plurality of third delay times derived from an interpolation of the second delay times, and wherein the fractional part of the delay time is generated by the second delay operation and the third delay operation.

It should be noted that in the practical implementation, the inventive equalizer may be couple to one or more conventional equalizer to cancel/reduce the stub effect.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

In the high speed data communication system (e.g. DVI or HDMI), the stub effect may be quite severe. With the help of the inventive equalizer, stub effect caused by the stub of every possible length can be reduced/cancelled so as to improve the quality of the communication.

Those skilled in the art will readily observe that numerous modifications and alterations of the device and method may be made while retaining the teachings of the invention.

What is claimed is:

1. An equalizer, for equalizing an input signal to generate an equalized signal, comprising:
    a summing device, for adding a feedback delay signal to the input signal to generate the equalized signal; and
    a delay device, coupled to the summing device, for delaying the equalized signal to generate the feedback delay signal;
    wherein the delay device has a variable delay time corresponds to a length of a stub at a transmitting end from which the input signal transmits and the variable delay time has a non-integer multiple of a bit time of the input signal; and the variable delay time is generated according to an interpolation.

2. The equalizer of claim 1, wherein the equalizer is utilized for equalizing signal reflection caused by the stub.

3. The equalizer of claim 1, wherein the delay device comprises:
    a sampling circuit, comprising a first flip-flop, coupled to the summing device, for sampling the equalized signal to output a sampled signal according to a first clock signal; and
    a delay generating circuit, coupled to the sampling circuit, for delaying the sampled signal with the variable delay time to generate the feedback delay signal.

4. The equalizer of claim 3, wherein the delay generating circuit comprises:
    a second flip-flop, coupled to the first flip-flop, for delaying the sampled signal to output the feedback delay signal according to a second clock signal;
    a phase interpolator, for generating a plurality of clock signals with different phases by interpolation according to a reference clock; and
    a phase selector, coupled to the phase interpolator and the second flip-flop, for selecting one of the plurality of clock signals to be the second clock signal.

5. An equalizing method, for equalizing an input signal to generate an equalized signal, comprising:
    adding a feedback delay signal to the input signal to generate the equalized signal;
    utilizing a delay device to delay the equalized signal to generate the feedback delay signal, wherein the delay device has a variable delay time corresponds to a length of a stub at a transmitting end from which the input signal transmits; and utilizing the delay device to generate the variable delay time according to an interpolation;

wherein the variable delay time has a non-integer multiple of a bit time of the input signal.

6. The equalizing method of claim 5, wherein the equaling method is utilized for equalizing signal reflection caused by the stub.

7. The equalizing method of claim 5, wherein the step of utilizing the delay device to delay the equalized signal comprises utilizing the delay device for:

sampling the equalized signal to output a sampled signal according to a first clock signal;

generating a plurality of clock signals with different phases according to a reference clock with the interpolation;

selecting one of the clocks signals to be a second clock signal; and delaying the sampled signal to output the feedback delay signal according to the second clock signal.

8. An equalizer, for equalizing an input signal to generate an equalized signal, comprising:

a summing device, for adding a feedback delay signal to the input signal to generate the equalized signal; and a delay device, coupled to the summing device, for delaying the equalized signal to generate the feedback delay signal, comprising:

a sampling circuit, comprising a first flip-flop, coupled to the summing device, for sampling the equalized signal to output a sampled signal according to a first clock signal; and a delay generating circuit, coupled to the sampling circuit, for delaying the sampled signal with the variable delay time to generate the feedback delay signal, comprising:

a plurality of first delay units, coupled in series, having a plurality of first integer delay times, for delaying the sampled signal with the first integer delay times, respectively;

a plurality of second delay units, coupled in series, having a plurality of second non-integer delay times, for delaying the sampled signal with the second non-integer delay times, respectively; and a plurality of gain units, respectively coupled between each of the first delay units and each of the second delay units, wherein each of the gain units gains an output of each of the first and the second delay units, and wherein each of outputs of the gains units are summed to form the feedback delay signal;

wherein the delay device has a variable delay time corresponds to a length of a stub at a transmitting end from which the input signal transmits and the variable delay time has a non-integer multiple of a bit time of the input signal.

9. The equalizer of claim 8, wherein the delay generating circuit further comprises a plurality of third delay units which are coupled in series and implemented according to an interpolation of the second delay units, and wherein the fractional part of the variable delay time is generated by the second delay units and the third delay units.

10. An equalizing method, for equalizing an input signal to generate an equalized signal, comprising:

adding a feedback delay signal to the input signal to generate the equalized signal; and utilizing a delay device to delay the equalized signal to generate the feedback delay signal, comprising:

utilizing the delay device for:

sampling the equalized signal to output a sampled signal according to a clock signal;

performing a first delay operation for delaying the sampled signal with a plurality of first integer delay times, respectively;

performing a second delay operation for delaying the sampled signal with a plurality of second non-integer delay times, respectively; and gaining a result of each of the first and the second delay operations to generate a plurality of gained results;

wherein the delay device has a variable delay time corresponds to a length of a stub at a transmitting end from which the input signal transmits and the variable delay time has a non-integer multiple of a bit time of the input signal.

11. The equalizing method of claim 10, wherein the step of utilizing a delay device to delay the equalized signal further comprises: utilizing the delay device for performing a third delay operation for delaying the sampled signal with a plurality of third delay times according to an interpolation of the second delay times, and wherein the fractional part of the variable delay time is generated by the second delay operation and the third delay operation.

12. The equalizing method of claim 10, wherein the feedback delay signal is formed by summing the gained results.

* * * * *